(12) United States Patent
Myhre

(10) Patent No.: US 7,549,797 B2
(45) Date of Patent: Jun. 23, 2009

(54) TEMPERATURE MEASUREMENT SYSTEM

(75) Inventor: Douglas C. Myhre, Eden Prairie, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 191 days.

(21) Appl. No.: 11/709,070

(22) Filed: Feb. 21, 2007

(65) Prior Publication Data

US 2008/0198900 A1   Aug. 21, 2008

(51) Int. Cl.
*G01K 7/00* (2006.01)
*G01K 5/00* (2006.01)
*H01L 35/00* (2006.01)
*B22D 11/00* (2006.01)

(52) U.S. Cl. .................. 374/179; 374/204; 374/205; 374/141; 136/221; 136/230; 164/451; 164/452

(58) Field of Classification Search .................. 374/179, 374/204, 205, 141; 136/221, 230; 164/451, 164/452
See application file for complete search history.

(56) References Cited

U.S. PATENT DOCUMENTS

| | | | | |
|---|---|---|---|---|
| 3,015,234 | A | * | 1/1962 | Springfield .................. 374/153 |
| 3,478,808 | A | * | 11/1969 | Adams ........................ 164/454 |
| 3,559,485 | A | | 2/1971 | Hovis et al. |
| 3,731,536 | A | * | 5/1973 | Baumann et al. ............. 374/110 |
| 3,915,216 | A | | 10/1975 | Fekete et al. |
| 4,009,750 | A | | 3/1977 | Fekete et al. |
| 4,073,332 | A | | 2/1978 | Etienne et al. |
| 4,101,364 | A | | 7/1978 | Tsukada et al. |
| 4,383,004 | A | * | 5/1983 | Spengler ..................... 428/619 |
| 4,521,088 | A | | 6/1985 | Masom et al. |
| 4,666,297 | A | | 5/1987 | Suarez-Gonzalez |
| 4,699,202 | A | | 10/1987 | Gilles |
| 4,786,188 | A | | 11/1988 | Myhre et al. |
| 4,836,689 | A | | 6/1989 | O'Brien et al. |
| 5,125,739 | A | | 6/1992 | Suarez-Gonzalez et al. |
| 5,146,244 | A | | 9/1992 | Myhre et al. |

(Continued)

FOREIGN PATENT DOCUMENTS

BE         822744         3/1975

(Continued)

OTHER PUBLICATIONS

European Search Report dated Sep. 11, 2007 for Application No. 07008704.4.

(Continued)

*Primary Examiner*—Gail Verbitsky
*Assistant Examiner*—Mirellys Jagan
(74) *Attorney, Agent, or Firm*—Scott D. Wofsy; Edwards Angell Palmer & Dodge LLP

(57) ABSTRACT

The invention provides a temperature measurement system including a temperature sensor and means for biasing the temperature sensor in the direction of a thermal energy source in response to receiving thermal energy from the source. The invention also provides a continuous casting system including at least one temperature sensor disposed in the secondary cooling region and means for biasing the temperature sensor in the direction of the strand of metal in response to receiving thermal energy from the strand of metal.

20 Claims, 7 Drawing Sheets

U.S. PATENT DOCUMENTS

| | | |
|---|---|---|
| 5,472,145 A | 12/1995 | Shannon et al. |
| 5,725,202 A | 3/1998 | Nakamura et al. |
| 6,264,767 B1 | 7/2001 | Frank et al. |
| 6,374,901 B1 | 4/2002 | Frank et al. |
| 6,578,777 B2 | 6/2003 | Bui |
| 6,688,534 B2 | 2/2004 | Bretz |
| 6,729,562 B2 | 5/2004 | Bui |
| 6,863,228 B2 | 3/2005 | Mao et al. |
| 2003/0150587 A1 | 8/2003 | Li et al. |
| 2005/0247066 A1 | 11/2005 | Myhre |
| 2006/0000219 A1 | 1/2006 | Myhre |

FOREIGN PATENT DOCUMENTS

| | | |
|---|---|---|
| BE | 862611 | 7/1978 |
| BE | 884195 | 1/1981 |
| DE | 3827254 A1 * | 2/1990 |
| JP | 58199612 | 11/1983 |
| JP | 60015059 | 1/1985 |
| JP | 62230464 | 10/1987 |
| JP | 63235055 | 9/1988 |
| JP | 04058117 | 2/1992 |
| JP | 04339555 | 11/1992 |
| JP | 08267207 | 10/1996 |
| JP | 2004243390 | 9/2004 |
| RU | 2236325 | 9/2004 |
| WO | WO-0003042 | 1/2000 |

OTHER PUBLICATIONS

Metals Manufacturing—Continuous Caster Lance/Nozzle System, Goodrich, Delavan Spray Technologies, Apr. 2005.

* cited by examiner

TEMPERATURE MEASUREMENT SYSTEM

BACKGROUND OF THE INVENTION

1. Field of the Invention

The present invention relates to a temperature measurement system for monitoring the operating temperatures in a process. Particularly, the present invention is directed to a temperature measurement system wherein the temperature sensor is biased in the direction of thermal energy emitted by the body to be measured.

2. Description of Related Art

A variety of temperature measurement devices are known in the art for monitoring temperatures within a process. Of such devices, many are directed to measuring the temperature of metal being cast in a continuous casting process.

In a continuous casting machine (or "caster"), molten metal is poured into a cooled copper faced mold that controls the physical width and thickness of the finished product. Metal exits the mold in the form of a strand or slab having a thin shell of solidified metal with a core of molten metal. The strand continues into a secondary cooling zone to further solidify the metal. As the metal passes through the machine it is gradually cooled (secondary cooling) with water sprays or water/air mix sprays which are used to convert the molten metal from a liquid state to a semi-solid state as it changes direction from the vertical into the horizontal direction for handling and processing. The rate of cooling has a direct effect on the metallurgical characteristic of the metal being produced and there is an ideal cooling curve, known to those skilled in the art, which should be followed in order to achieve the best quality.

Unfortunately, because of the design of modern continuous casting machines, the best possible control of temperature is limited under the state of the art. From the exit of the mold to the horizontal point, the continuous casting machine length is divided into zones and preset water flow values are available to increase or decrease the volume of cooling water to those zones in order to achieve an exit temperature from the zone. Currently, the metal surface temperature is measured with optical pyrometers or similar devices. However, no successful attempts have been made to integrate that temperature to a predetermined curve such as an ideal curve, and imprecise cooling is the result. This is due in large part to the inability of traditional measurement systems to make accurate temperature readings in the casting environment, which includes temperature diverse flows of cooling fluids, gases, heated steam, other impurities, and metal in various stages of the liquid to solid transition.

It is desirable to keep the surface temperature of the metal controlled in a manner to prevent surface cracks or internal defects, which may occur if the metal is cooled too quickly, or prevent a breakout of molten metal from the core of the slab. Breakout is a major problem that occurs when the thin shell of the strand of material breaks, allowing the still-molten metal inside the strand to spill out and foul the casting system, requiring an expensive shutdown. Often, breakout is due to too high a withdrawal rate, resulting in the shell not having enough time to solidify to the required thickness. Alternatively, breakout can be due to the metal being too hot, which means that final solidification takes place below the straightening rolls and the strand breaks due to stresses applied during straightening. A typical breakout can cost a steel mill $250,000 and it is not uncommon to have two or three breakouts per month.

These failures result in costly further waste, processing, or expensive and dangerous consequences to personnel and equipment. In particular, for the steel industry, properly controlled surface temperatures result in better quality of steel and increased production rates.

To minimize breakouts, the conventional wisdom is to follow empirically established cooling processes that tend to overcool the slab as it passes through the caster. This is accomplished by controlling the flow of coolant with the assistance of a series of preset flow rates. The preset rates are adjusted to achieve an approximate temperature at various points along the caster. While slab temperature is sometimes checked with a measuring device, this device is not integrated into the coolant control system. It is common to only have a fixed pyrometer at the exit from the caster prior to the slab being cut. The resulting lack of accurate temperature control during formation of the shell can affect the product quality because of the inability of the system to follow a preferred cooling rate.

Attempts have been made in the art to address these deficiencies by providing a feedback mechanism to control the cooling of the slab as it passes through the caster. For example, U.S. Pat. No. 4,073,332 describes such a system. However, such systems suffer from certain deficiencies. A particular example of such a deficiency is the lack of temperature sensors that are suitable for the harsh environment inside of a caster, which tends to be extremely hot with very low visibility and high vibration. This deficiency is recognized in part by U.S. Pat. No. 4,073,332 at Col. 5, lines 6-10. Moreover, it has been recognized by others that the approach described in U.S. Pat. No. 4,073,332 is not practicable. For example, U.S. Pat. No. 4,699,202 recognizes the deficiencies of U.S. Pat. No. 4,073,332 at Col. 2, lines 8-21 in detail. The specifications of each of these patents are incorporated by reference herein in their entireties.

The need to improve the quality and the quantity of continuously cast materials with reduced down time is a driver in certain metal production industries, such as the steel industry. The state of the art still does not include a system for measuring the temperature of continuously cast metal with sufficient accuracy to allow for active control of the continuous casting process in a meaningful manner. There is still a long felt need in the art for such a system. There also remains a need in the art for such a temperature measurement system that is easy to make and use, and that is robust enough to reliably operate in harsh environments such as in a continuous casting process. The present invention provides a solution for these problems.

SUMMARY OF THE INVENTION

The purpose and advantages of the present invention will be set forth in and become apparent from the description that follows. Additional advantages of the invention will be realized and attained by the methods and systems particularly pointed out in the written description and claims hereof, as well as from the appended drawings.

To achieve these and other advantages and in accordance with the purpose of the invention, as embodied herein, the invention includes a temperature measurement system including a temperature sensor adapted and configured to measure the temperature of a body. The temperature measurement system also includes means for biasing the temperature sensor in the direction of the body in response to heat exchange with the body. The body can be a thermal energy source and the means for biasing the temperature sensor can bias the temperature sensor in the direction of the thermal energy source in response to receiving thermal energy from the source.

In accordance with a further aspect of the invention, the means for biasing may include a bimetallic member adapted and configured to extend from a first position in the absence of the thermal energy source to a second position when in the presence of the thermal energy source. The bimetallic member can be generally elongate and can deflect laterally when heated to move from the first position to the second position. It is also envisioned that the bimetallic member can be generally coil shaped or generally helical in shape. The bimetallic member can also include multiple bimetallic strips attached to each other end to end in an accordion configuration. The bimetallic member can include a first portion that is 302 stainless steel and a second portion that is 410 stainless steel. However, any suitable materials can be used in the bimetallic member, as will be appreciated by those of skill in the art, without departing from the spirit and scope of the invention.

In accordance with another aspect of the invention, the temperature sensor can include at least one thermocouple. The thermocouple can include a second bimetallic member. Alternatively, the bimetallic member can simultaneously serve both as means for biasing and as a thermocouple junction itself. The thermocouple can be of a type including tip sensitive, grounded junction, consumable, non-consumable, and thermopile. It is also envisioned that the temperature sensor can be a thermistor, optical fiber thermometer, resistance temperature detector ("RTD"), temperature sensitive capacitor ("TSC"), a set of electrodes calibrated to infer temperature based on electrical resistance between the electrodes, or any other suitable temperature sensor. It is further envisioned that the temperature sensor can be in thermal contact with the thermal energy source through a protective layer while in the second position. The protective layer can be a wear bar affixed to the bimetallic member.

The invention also includes a system for monitoring the temperature of a strand of metal in a continuous casting system having a temperature sensor adapted and configured to receive thermal energy from the strand of metal. The system also includes a generally elongate bimetallic strip operatively associated with the temperature sensor, the bimetallic strip being configured and adapted to move the temperature sensor in response to thermal energy received from the strand of metal back and forth between a first position in the absence of the strand of metal, in which the bimetallic strip retracts the temperature sensor to a position that clears a passing dummy bar without damage to the sensor, and a second position when in the presence of the strand of metal, in which the temperature sensor is in thermal contact with the strand of metal.

The invention also includes a continuous casting system including a mold for dispensing a strand of metal and a secondary cooling region downstream from the mold. The secondary cooling region includes a plurality of rollers for conveying the strand of metal from the mold and a plurality of spray nozzles for cooling the strand as it passes by the rollers. The system also preferably includes a dummy bar movably disposed in the system. The dummy bar can be adapted and configured to meet the strand of metal in an extended position when a new strand of metal is initially formed during start up of the system. The dummy bar can be further adapted and configured to retract to allow the strand to move along the plurality of rollers through the system. The system also includes at least one temperature sensor disposed in the secondary cooling region and at least one means for biasing the at least one temperature sensor in the direction of the strand of metal in response to receiving thermal energy from the strand of metal. The at least one means for biasing is preferably adapted and configured to extend from a first position wherein the at least one temperature sensor is displaced from a plane through which the strand of metal passes, to a second position wherein the at least one temperature sensor is in close proximity to the plane. It is envisioned that the a plurality of temperature sensors can be arranged in an array to measure temperatures across a width and across a length of the strand, each temperature sensor having a means for biasing associated therewith.

In further accordance with the invention, the means for biasing can include a bimetallic member. The bimetallic member can be generally elongate and can deflect laterally when heated to move from the first position to the second position. It is envisioned that the bimetallic strip can alternatively have a generally coiled or helically shaped body. It is envisioned that the means for biasing can be adapted and configured to extend from the first position to the second position when heat radiated from the strand of metal is received by the means for biasing.

In accordance with yet another aspect of the invention, the temperature sensor can include at least one thermocouple. The thermocouple can include a second bimetallic member, or alternatively the bimetallic member can serve as both the thermocouple and the means for biasing. It is envisioned that the thermocouple can be of any of the following types: tip sensitive, grounded junction, consumable, non-consumable, and thermopile. It is also envisioned that the temperature sensor can include at least one thermistor, optical fiber thermometer, RTD, TSC, a set of electrodes calibrated to infer temperature based on electrical resistance between the electrodes, or any other suitable temperature sensor.

The invention further includes a temperature measurement device including a temperature sensor configured to measure a temperature of a body and a heat sensitive biasing member coupled to the temperature sensor. In accordance with a further aspect of the invention, the heat sensitive biasing member can be configured to bias the temperature sensor toward the body in response to heat exchange with the body. The heat sensitive biasing member can be further configured to bias the temperature sensor away from the body in response to absence of heat exchange with the body. It is also envisioned that the heat sensitive biasing member can be configured to extend from a first position wherein the temperature sensor is displaced away from the body to a second position in which the temperature sensor is in close proximity to the body in response to heat received from the body.

In accordance with another aspect of the invention, the heat sensitive biasing member can include at least on bimetallic element. It is envisioned that the at least one bimetallic element can be a bimetallic strip. It is also envisioned that the bimetallic element can included a generally coil shaped body. The bimetallic element can also be generally helically shaped. Furthermore, it is also envisioned that the bimetallic element can include a plurality of bimetallic strips attached to each other end to end in an accordion configuration.

The invention also includes a method for measuring a temperature of a body. The method includes steps of providing a temperature sensor with a heat sensitive biasing member coupled thereto, extending the heat sensitive biasing member from a first position wherein the temperature sensor is displaced away from the body to a second position in which the temperature sensor is in close proximity to the body in response to heat received from the body, measuring the temperature of the body with the temperature sensor, removing the body from close proximity with the temperature sensor and heat sensitive biasing member, and retracting the heat sensitive biasing member from a second position back to the first position in response to lack of proximity with the body.

In further accordance with the invention, the step of extending can include extending to a second position in which the temperature sensor physically contacts a surface of the body. In accordance with still another aspect of the invention, the body can be a strand of metal in a continuous casting system, and the step of retracting can include retracting the temperature sensor to a location that is clear from a dummy bar movably disposed within the continuous casting system, the dummy bar being adapted and configured to extend to meet the strand of metal when a new strand of metal is initially formed in the system, the dummy bar being further adapted and configured to retract as the strand moves through the system. Moreover, the step of measuring can include protecting the temperature sensor from direct physical contact with the strand of metal by measuring the temperature of the body with the temperature sensor disposed within a wear bar, the wear bar being in direct physical contact with the strand of metal.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

DETAILED DESCRIPTION OF THE PREFERRED EMBODIMENT

Reference will now be made in detail to the present preferred embodiments of the invention, examples of which are illustrated in the accompanying drawings. The temperature measurement system and corresponding parts of the invention will be described in conjunction with the detailed description of the system.

The devices and methods presented herein may be used for measuring the operating temperatures of processes. The present invention is particularly suited for measuring temperatures in processes which require extension and subsequent retraction of a temperature sensor, such as when measuring the temperature of a slab or strand of metal being continuously cast while avoiding damaging interference with a structure, such as a dummy bar, moving back and forth between subsequent slabs or strands.

In accordance with the invention, a continuous casting system is provided including a mold for dispensing a strand of metal, a secondary cooling region downstream from the mold including a plurality of rollers for conveying the strand of metal from the mold and a plurality of spray nozzles for cooling the strand as it passes by the rollers. The system also preferably includes a dummy bar movably disposed in the system. The dummy bar is displaceable between a retracted position and an extended position. The dummy bar is adapted and configured to meet a strand of metal in the extended position when a new strand of metal is initially formed during start up of the system. The dummy bar is further adapted and configured to retract as the strand moves along the plurality of rollers through the system. The system also includes at least one temperature sensor disposed in the secondary cooling region, and means for biasing the temperature sensor in the direction of the strand of metal in response to receiving thermal energy from the strand of metal. The means for biasing is adapted and configured to extend from a first position wherein the temperature sensor is displaced from a plane through which the strand of material passes, to a second position wherein the temperature sensor is in close proximity to the plane.

Figure 1:
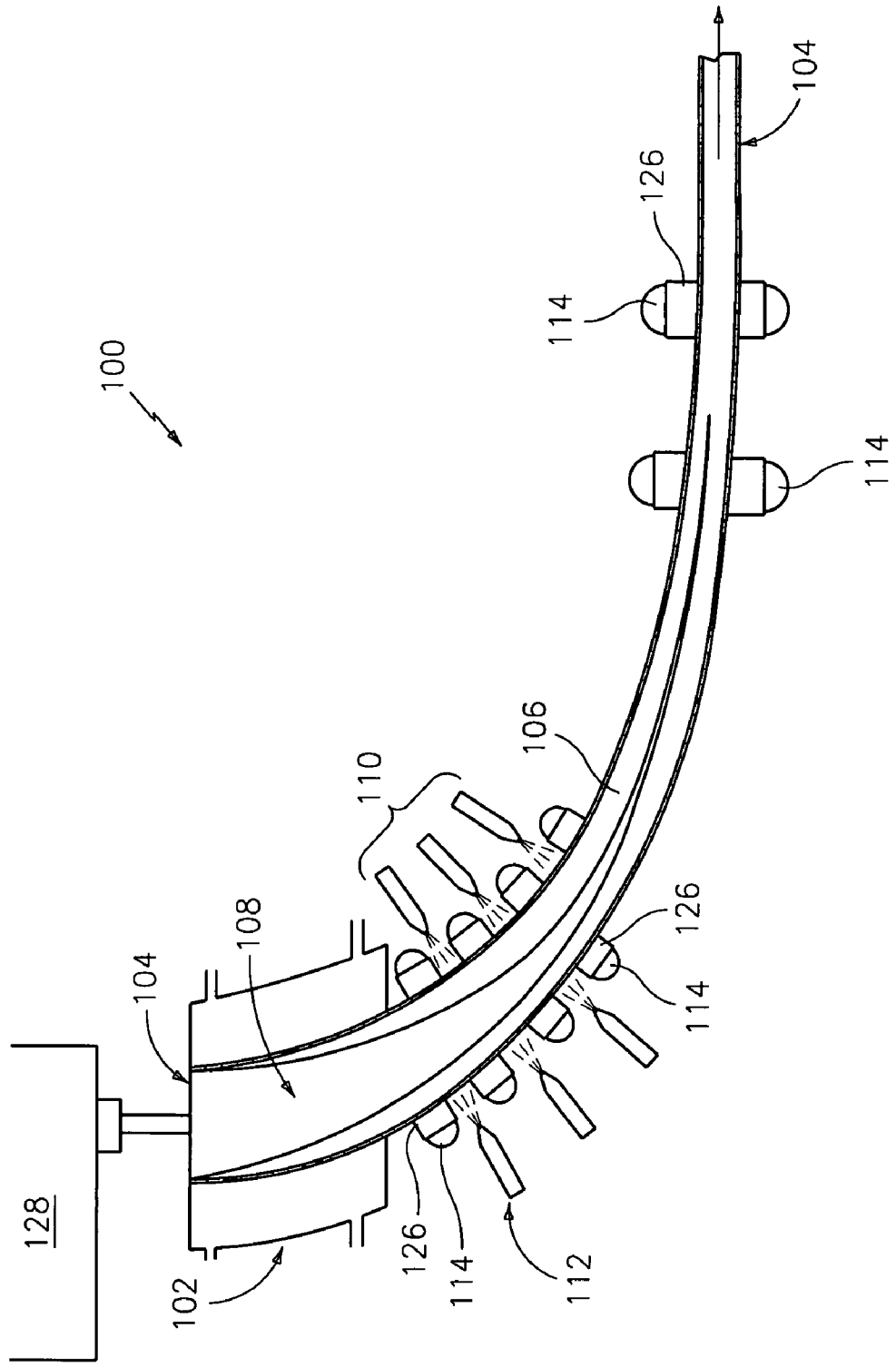
FIG. 1 is a diagram of a continuous casting system in accordance with the present invention.

For purpose of explanation and illustration, and not limitation, a partial view of an exemplary embodiment of the continuous casting system in accordance with the invention is shown in FIG. 1 and is designated generally by reference character 100. Embodiments of a temperature measurement system in accordance with the invention, or aspects thereof, are provided in FIGS. 2-10, as will be also be described below.

In accordance with the invention, a continuous casting system is provided having a mold for dispensing a strand of metal, a secondary cooling region downstream from the mold, and a dummy bar adapted and configured to meet the strand of metal during start up of the system and to retract as the strand moves through the system.

For purposes of illustration and not limitation, as embodied herein and as depicted in FIG. 1, a continuous casting system, (or "caster") 100 is provided with a mold 102 for dispensing a strand 104 of metal. Mold 102 controls the physical width and thickness of the finished product. Molten metal from a ladle and/or tundish 128 is poured into the top of mold 102, which has means for cooling the molten metal to begin forming solidified shell 106 around liquid crater 108 of molten metal, thus making strand 104. Strand 104 exits mold 102 to enter secondary cooling region 110.

Secondary cooling region 110 further cools strand 104 and gradually bends strand 104 from a generally vertical flow direction to a generally horizontal flow direction. Sprayers 112 spray water, air, or a mix of water and air onto strand 104 to further cool the metal. Rollers 114 help form and move strand 104 through caster 100. The cooling of the metal preferably conforms to an ideal cooling curve, known to those skilled in the art, in order to achieve the best metallurgical characteristics in strand 104.

Figure 2:
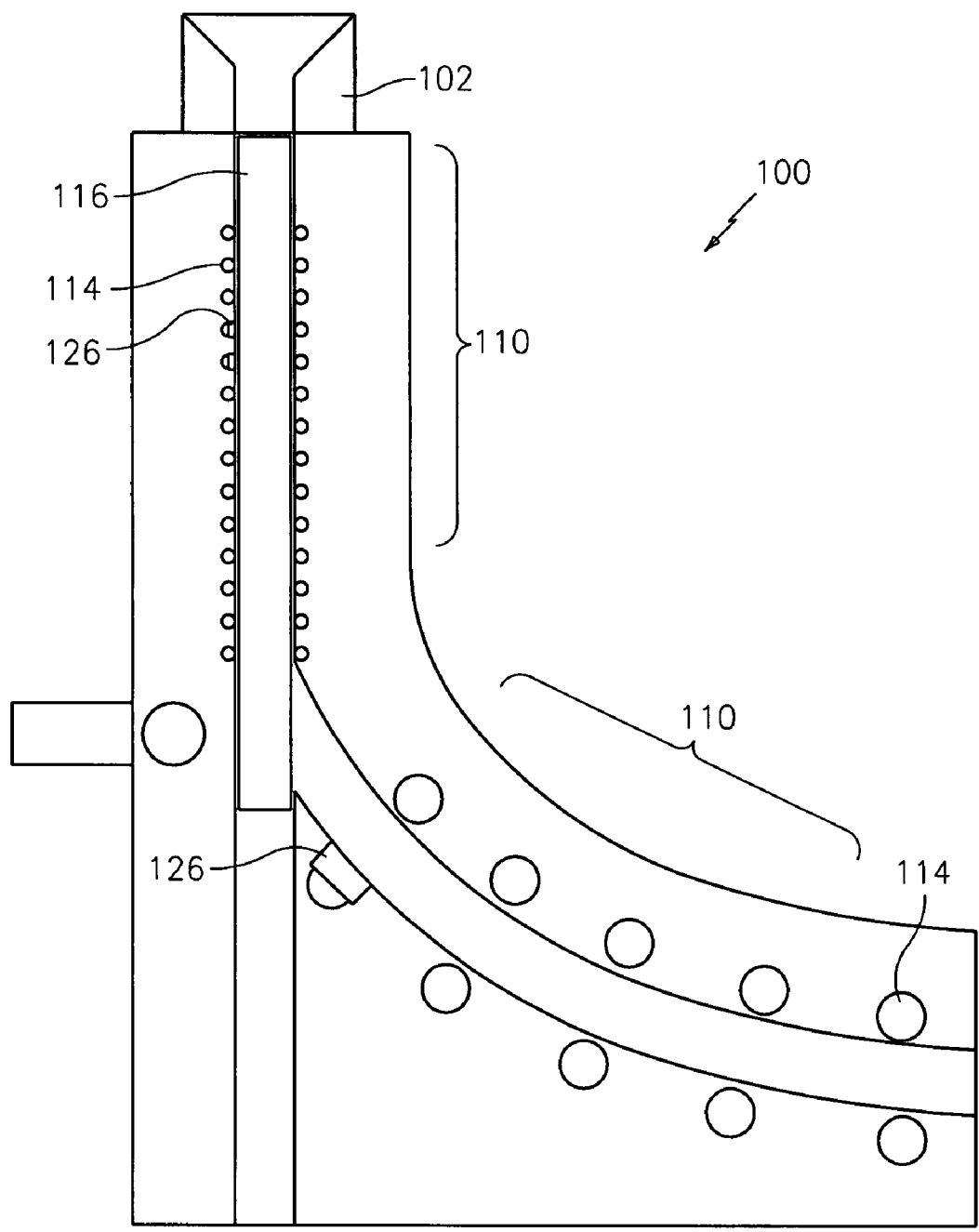
FIG. 2 is a diagram of a continuous casting system in accordance with the present invention, showing the dummy bar in the extended position prior to releasing the strand of metal into the secondary cooling region.
Figure 3:
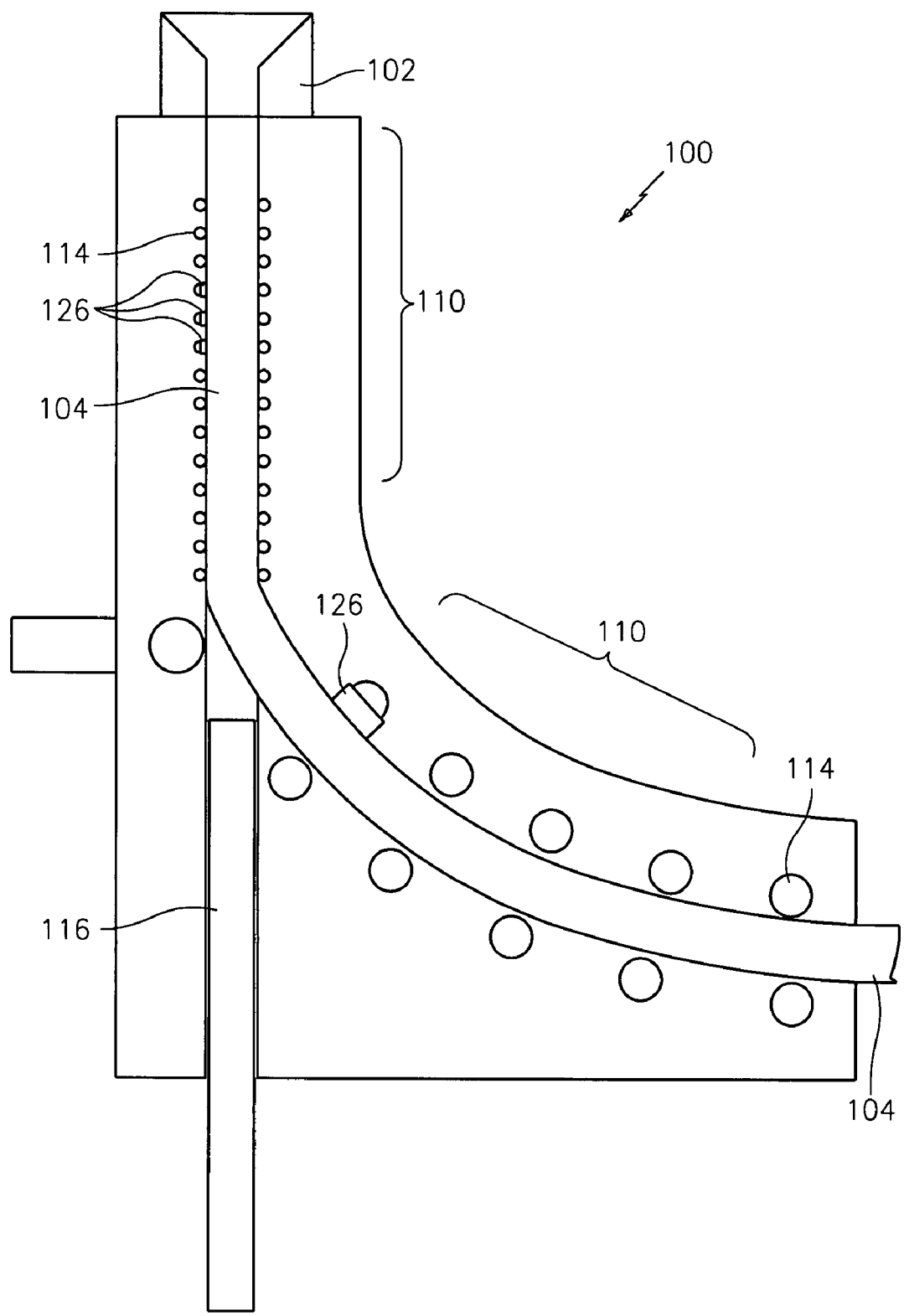
FIG. 3 is a diagram of the continuous casting system shown in FIG. 2, showing the dummy bar in the retracted position as the strand of metal passes through the secondary cooling region.

Dummy bar 116, shown in FIGS. 2-3, assists in the start up of the continuous casting process. Prior to forming strand 104 in mold 102, dummy bar 116 extends upward through the vertical portion of secondary cooling region 110. In this position, dummy bar 116 blocks the opening on the bottom of mold 102, as shown in FIG. 2. In this manner, dummy bar 116 prevents metal from entering secondary cooling region 110 prematurely. When the proper conditions are present in mold 102, dummy bar 116 retracts downward, freeing the way for strand 104 to enter secondary cooling region 110, as shown in FIG. 3.

Caster 100 can be configured in a variety of different arrangements, including vertical casting as opposed to casting from vertical to horizontal. Further, the exact arrangement of mold 102, secondary cooling region 110, sprayers 112, rollers 114, and dummy bar 116 can also be varied. Those of ordinary skill in the art will readily appreciate that any variation of caster 100 can be used without departing from the spirit and scope of the invention.

In further accordance with the invention, a temperature sensor is provided, disposed in the secondary cooling region. A means for biasing the temperature sensor in the direction of the strand of metal in response to receiving thermal energy from the strand of metal is also provided.

Figure 4:
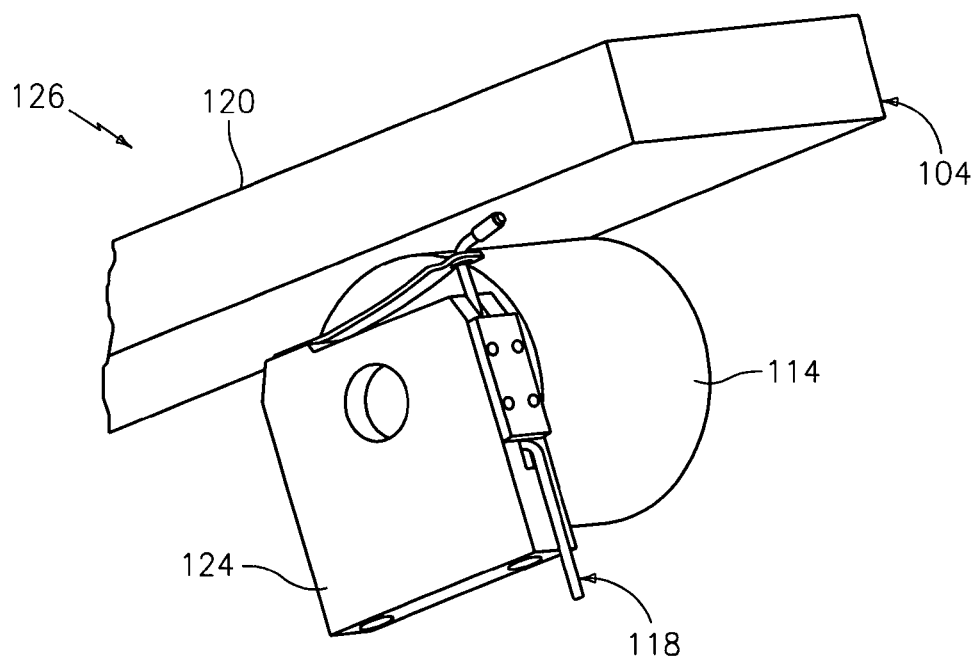
FIG. 4 is a perspective view of a casting roll of the system of FIG. 1, showing the temperature measurement system as in accordance with one embodiment of the present invention.
Figure 5:
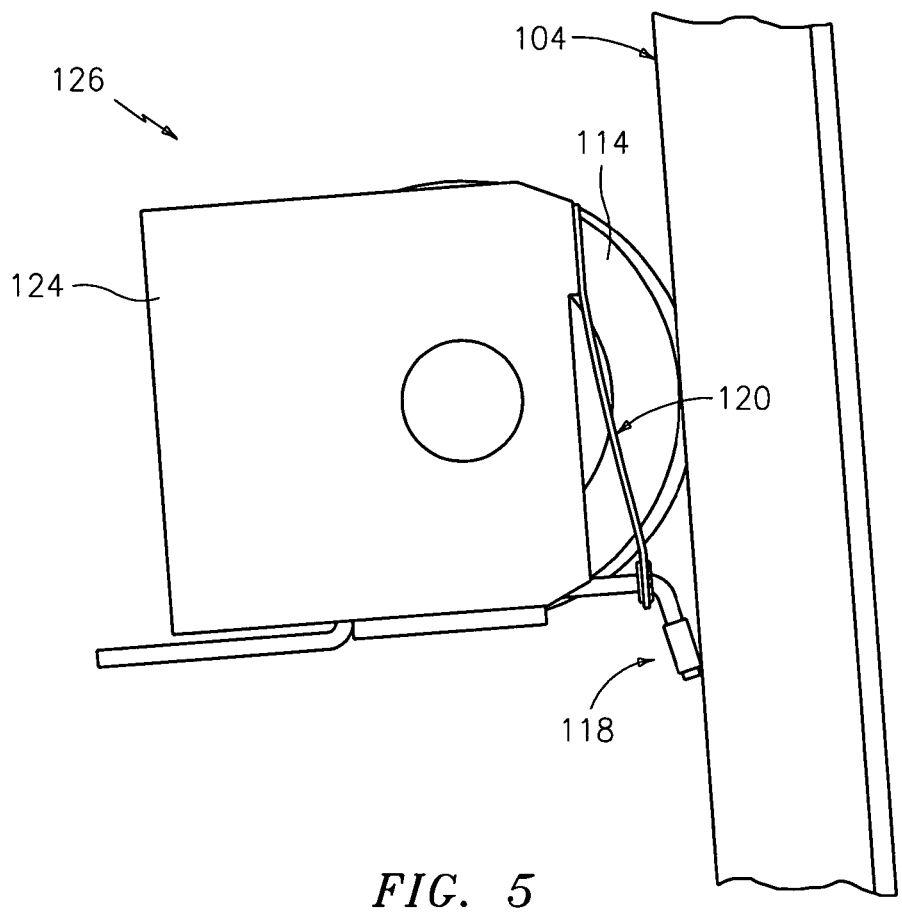
FIG. 5 is side elevation view of the temperature measurement system of FIG. 4, showing the temperature sensor in the extended position where it contacts the slab of cast metal.

For purposes of illustration and not limitation, as embodied herein and as depicted in FIGS. 4-5, caster 100 includes a sub-system in proximity to rollers 114, namely temperature measurement system 126, including temperature sensor 118 and member 120.

To facilitate accurate temperature measurements of strand 104, a contact-type temperature sensor preferably makes positive thermal contact with the surface of strand 104. Means for biasing may be provided, for example in the form of heat sensitive biasing member 120, which takes advantage of the heat radiating from strand 104 by biasing sensor 118 toward the surface of strand 104 in response to the heat radiating therefrom. Sensor 118 and member 120 are configured and dimensioned so that when sensor 118 is biased toward strand 104 a positive thermal contact is achieved between strand 104 and sensor 118.

In the preferred embodiment, member 120 includes an elongate, bimetallic strip in which the two metals have different coefficients of thermal expansion. Preferably the two metals, formed into strips, are tightly bonded together into a single elongate strip, such as by welding a seam defined between the two metal strips around the edge of member 120. When strand 104 is present, the heat radiating therefrom has the effect of deforming the bimetallic strip. Member 120 is arranged so that the movement from the deformation of the bimetallic element is in a direction toward strand 104. Sensor 118 is disposed near an end of member 120 so that the result of member 120 responding to heat from strand 104 is that sensor 118 is brought into thermal contact with the surface of strand 104. In this position it is possible for sensor 118 to continuously measure the surface temperature of strand 104 as strand 104 moves past sensor 118.

In the absence of strand 104 and its accompanying heat, member 120 undergoes reverse deformation, which relaxes the bimetallic element, and thereby withdraws temperature sensor 118 away from the plane defined by the path of the surface of strand 104. Sensor 118 and member 120 can remain in the retracted position until a new strand 104 arrives, heating the bimetallic element once again, deforming member 120 and extending sensor 118 back into a position in thermal contact with the new strand 104, and so forth.

The ability of sensor 118 and member 120 to retract when there is no strand 104 present, and to extend toward the surface of a strand 104 when present, is particularly advantageous in the process of continuous casting. Dummy bar 116 extends up to mold 102, moving past rollers 114 and sensors 118, prior to each strand 104 being released through secondary cooling region 110. Dummy bar 116 then retracts moving down again past rollers 114 and sensors 118. If sensors 118 were always biased, by being spring loaded for example, toward the surface of strand 104, then in the absence of a strand 104 and dummy bar 116, sensors 118 would extend into the path of dummy bar 116. In this position, dummy bar 116 could easily shear temperature sensors 118 away from their mountings, or otherwise damage sensors 118, when dummy bar 116 moves past. Member 120 ensures that temperature sensor 118 extends into sensing position only when in the presence of strand 104. Temperature sensor 118 is therefore always clear from the path when dummy bar 116 passes and sensor 118 thus avoids being damaged thereby.

A variety of other means for biasing, such as heat sensitive biasing member 120, are also envisioned as being within the spirit and scope of the invention, besides bimetallic elements. Any device or mechanism capable of actuating movement of temperature sensor 118 toward strand 104 in response to heat from strand 104 can be used. By way of example, and not limitation, a pneumatic or hydraulic actuator coupled with a temperature feedback sensor responsive to heat from strand 104 could be used as a means for biasing a temperature sensor toward strand 104. However, the simplicity of operation and maintenance of bimetallic elements make them a preferable means of biasing.

Figure 10:
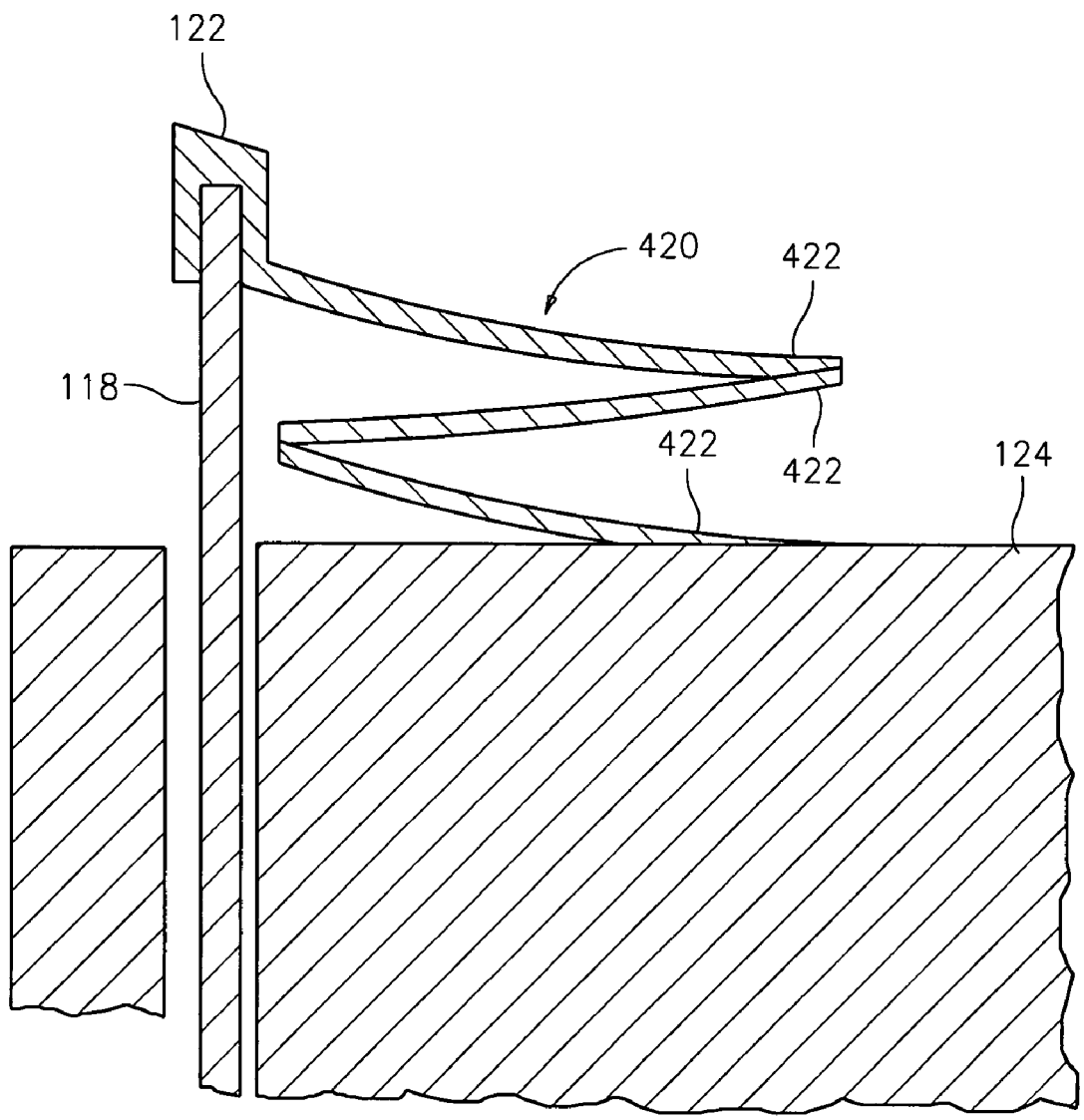
FIG. 10 is a cut away side elevation view of a portion of an alternative embodiment of the temperature measurement system shown in claim 6, wherein the bimetallic member is a combination of three bimetallic strips attached end to end.

There are also a wide variety of possible bimetallic elements that are possible. Member 120 is shown as an elongate strip. The size of a bimetallic element can vary within the scope of the invention, however preferably the bimetallic element is about 0.1 inches thick. However, the bimetallic element can also be coiled, helical, or any other suitable shape, without departing from the spirit and scope of the invention, as shown by way of example as coiled member 220 and helical member 320 in FIGS. 8 and 9, respectively. FIG. 10 shows yet another suitable member 420 in the form of three bimetallic elements 422 attached end to end in an accordion arrangement to increase the amount of deflection within the given space. Any number of bimetallic elements could be used in such an accordion configuration without departing from the spirit and scope of the invention.

Further, the bimetallic element can be made from a variety of combinations of metals. In a preferred embodiment, the bimetallic element of member 120 is made of a first portion that is 302 stainless steel and a second portion that is 410 stainless steel. However, those of ordinary skill in the art will readily contemplate other suitable materials that can be used to practice the invention without departing from its spirit and scope.

Similarly, there are a variety of types of temperature sensors 118 that can be used. Numerous suitable types of thermocouples are available, for example, from OMEGA Engineering, INC., One Omega Drive, Stamford, Conn. 06907-0047 P.O. Box 4047. In a preferred embodiment, a type-K thermocouple is used as sensor 118. However, any suitable consumable or non-consumable thermocouple can be used. If thermocouples are used as sensors 118, preferably they are tip sensitive or grounded junction thermocouples. In addition to thermocouples, other suitable temperature sensors 118 include thermistors, optic fiber thermometers, resistance temperature detectors ("RTD's"), temperature sensitive capacitors ("TSC's"), or any other sensors suited to measuring temperature in harsh environments like that in the continuous casting process. It is also possible for sensor 118 to be in the form of electrical leads, which when brought into physical contact with strand 104 can be used to measure electrical resistance of strand 104, and thereby infer the temperature of strand 104. It is also contemplated, since the junction of two dissimilar metals constitutes a thermocouple junction, that if a bimetallic element is used as member 120, the bimetallic element can itself double as a thermocouple. In other words, a bimetallic element, properly configured, can serve as both means for biasing and as sensor 118. It is also possible to practice the invention using multiple temperature sensors as sensor 118, such as a thermopile or an array of thermistors. All of these varieties of temperature sensors, and their equivalents, can be used without departing from the spirit and scope of the invention.

It is not necessary for temperature sensor 118 to come into direct physical contact with a moving strand 104, as shown in FIGS. 4 and 5. It is sufficient for sensor 118 to make positive thermal contact with strand 104. Moreover, in the context of temperature controlling a continuous casting process for example, it is not necessary for sensor 118 to provide exact temperatures of strand 104 itself, rather it is sufficient for sensor 118 to be responsive to changes in temperature in strand 104. In an alternative embodiment, shown by way of example and not limitation in FIGS. 6 and 7, wear bar 122 houses the sensitive portion of sensor 118. Wear bar 122 drags along the passing strand 104 and conducts heat from strand 104 into the sensitive portion of sensor 118. Wear bar 122 therefore protects the sensitive portion of sensor 118 from damage and wear that could arise from direct physical contact with strand 104, while also allowing meaningful temperature readings of strand 104 by placing sensor 118 in good thermal contact with strand 104. A variety of suitable materials exist for wear bar 122. However, in a preferred embodiment wear bar 122 is made of a nickel alloy, but any suitable wear resistant material that allows for thermal contact between sensor 118 and strand 104 can also be used.

As shown in FIGS. 4-7, sensor 118 and member 120 can be integrated into bearing block 124 of roller 114. This location allows for temperature measurement system 126 to achieve good contact against strand 104 without adding undue bulk or otherwise interfering with the other components in secondary cooling region 110. While this arrangement is preferred, those of ordinary skill in the art will readily appreciate that other locations for mounting system 126 within secondary cooling region 110 are not beyond the spirit and scope of the invention. Similarly, those of ordinary skill in the art will readily appreciate how to provide strain relief for any electrical leads that may be present for sensor 118. It is also preferred that member 120 and sensor 118 be integrated into bearing block 124 in such a way as to be replaceable while still in the operating position, thus reducing the amount of downtime required for changing out the components of system 126.

Preferably caster 100 has multiple temperature measurement systems 126 located throughout secondary cooling region 110. FIG. 1 shows each roller 114 in secondary cooling region 110 having a system 126 associated therewith. FIGS. 2 and 3 show different possible locations for systems 126, where only some of rollers 114 have systems 126 associated therewith. It is most preferable that multiple systems 126 be arranged in an array across the width and length of strand 104 in secondary cooling region 110. This arrangement allows for tight temperature control of strand 104, as it allows for more complete data on the surface temperature of strand 104. It is also contemplated that existing casters can be retrofitted with systems 126, or in the alternative new casters can be manufactured including integrated systems 126.

The state of the art of continuous casting is that non-contact-type temperature instruments must be used in secondary cooling region 110, such as infrared thermometers, radiometers, pyrometers or other optical and radiative instruments, so that the instrumentation can be offset from the path of dummy bar 116 and thus clear dummy bar 116 as it passes. The disadvantage of non-contact temperature measurement is that in general such techniques require clear visibility in order to provide meaningful surface temperature readings. However, clear visibility of strand 104 is virtually impossible due to the cooling sprays, steam, and other gasses present in proximity to strand 104. On the other hand, direct contact sensors provide much better readings. But traditionally direct contact sensors have had the disadvantage of needing to be replaced or repaired frequently because they risk being damaged each time dummy bar 116 passes. The only alternative has traditionally been to refrain from attempting any measurements within secondary cooling region 110, which gives the already stated disadvantage of deviation from ideal cooling curves with its accompanying loss in quality and risk of breakout, etc.

The invention advances the state of the art of continuous casting because it allows for the benefits of direct contact-type temperature instrumentation without the destruction of the temperature sensors. The invention has the benefit of providing contact-type temperature measurements of strand 104 within secondary cooling region 110, which are more reliable and meaningful than non-contact measurements, while also providing the advantages that non-contact instruments have in clearing dummy bar 116. The invention also overcomes the disadvantages of traditional measurement techniques by avoiding the repeated damage to sensors 118 typical of traditional contact instruments in secondary cooling region 110, while avoiding the inaccuracy incurred by non-contact instruments in the steamy environment of a continuous caster. Meaningful temperature measurements in secondary cooling region 110 that require little or no maintenance solve a long existing need in the art because they present the possibility of tighter cooling control systems that will increase quality and reduce breakouts and down time over the state of the art.

In accordance with another aspect of the invention, a temperature measurement system is provided. The system includes a temperature sensor adapted and configured to receive thermal energy from a thermal energy source and means for biasing the temperature sensor in the direction of the thermal energy source in response to receiving thermal energy from the source.

Figure 6:
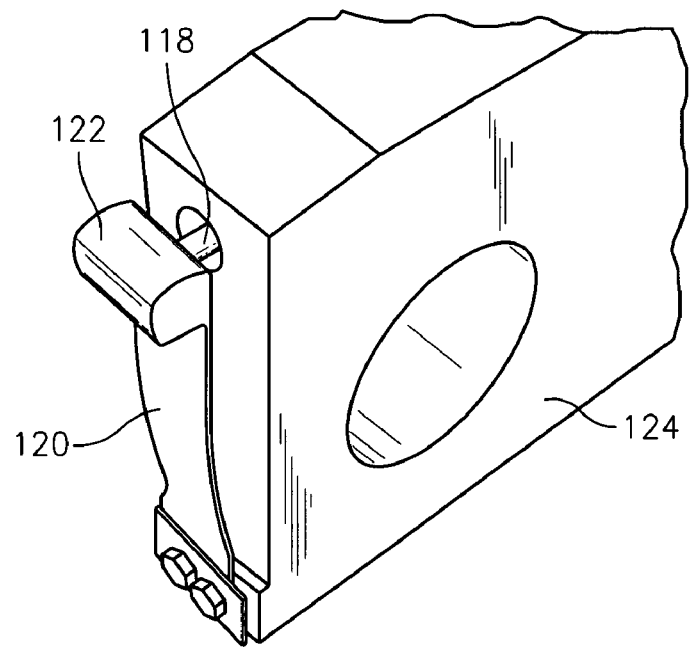
FIG. 6 is a perspective view of a temperature measurement system in accordance with another embodiment of the invention, wherein the temperature sensor is protected by a wear-bar.
Figure 7:
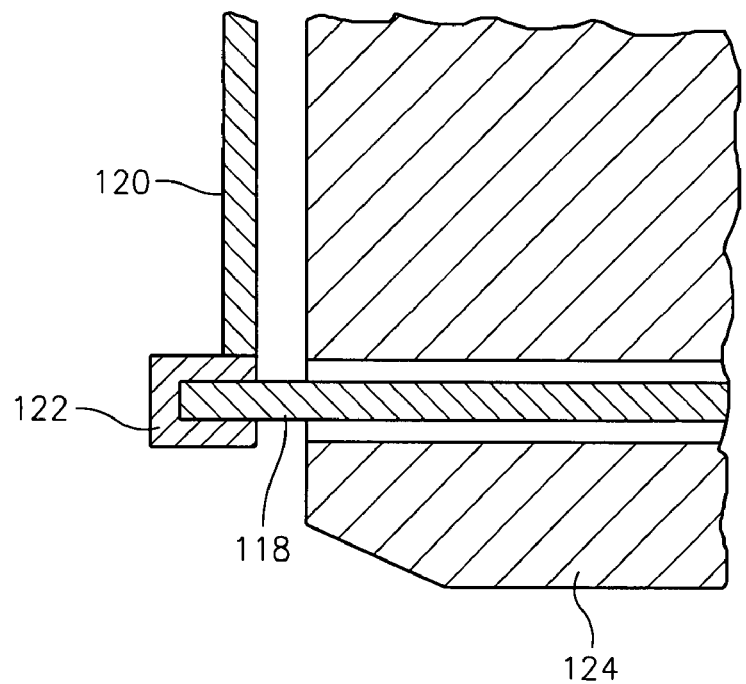
FIG. 7 is a cut away side elevation view of a portion of the temperature measurement system shown in FIG. 6, showing how the tip of the temperature sensor fits within the wear-bar.
Figure 8:
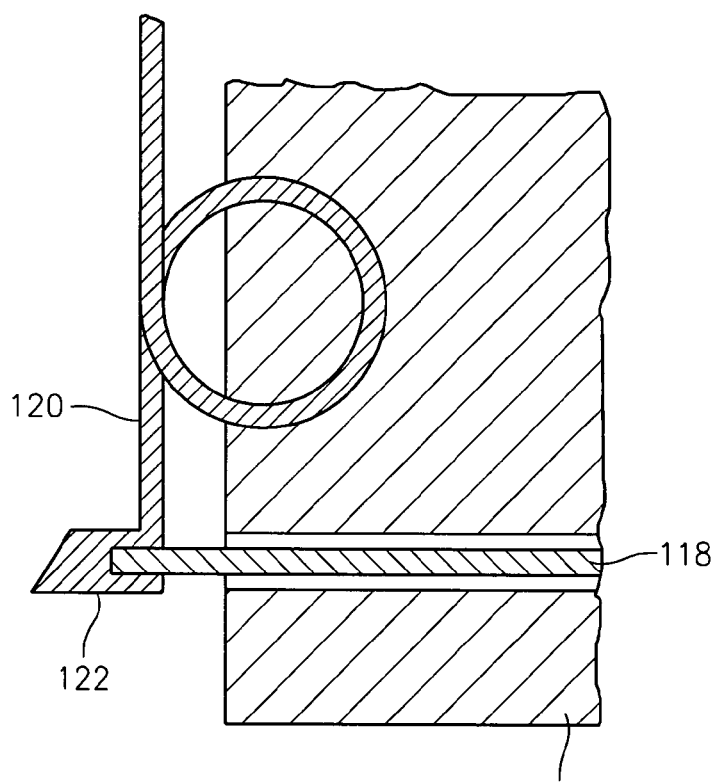
FIG. 8 is a cut away side elevation view of portion of an alternative embodiment of the temperature measurement system shown in FIG. 6, wherein the bimetallic member is coiled.
Figure 9:
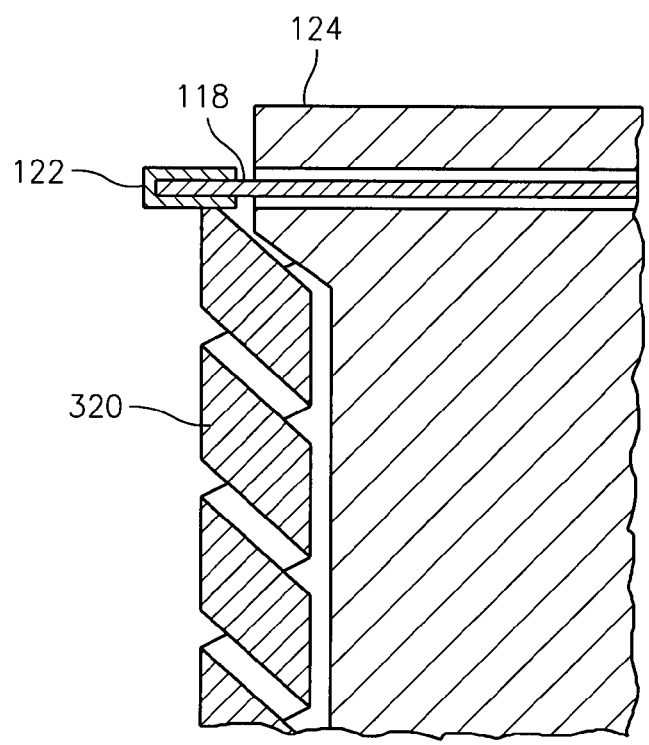
FIG. 9 is a cut away side elevation view of portion of an alternative embodiment of the temperature measurement system shown in FIG. 6, wherein the bimetallic member is helical.

For purposes of illustration and not limitation, as embodied herein and as depicted in FIGS. 4-5, with one alternative embodiment shown in FIGS. 6-7, temperature measurement system 126 is provided having temperature sensor 118 and heat sensitive biasing member 120. Temperature measurement system 126 of the invention is described in detail above in the context of a continuous casting system. However, the temperature measurement system of the invention is not limited to use in a continuous casting system. A temperature measurement system in accordance with the invention can be used in any process or system in which temperature sensors need to be withdrawn from the sensing position while not in use in order to avoid damage or contamination, and extended into the sensing position when in use, wherein the movement between the extended and withdrawn positions is in response to a change in temperature.

The systems of the present invention, as described above and shown in the drawings, provide for a temperature measurement system with superior properties including the ability to bias temperature sensors toward a body to be measured when the body is present and withdraw the sensors when the body is not present. It will be apparent to those skilled in the art that various modifications and variations can be made in the device and method of the present invention without departing from the spirit or scope of the invention. Thus, it is intended that the present invention include modifications and variations that are within the scope of the appended claims and their equivalents.

What is claimed is:

1. A temperature measurement system comprising:
   a) a temperature sensor adapted and configured to measure a temperature of a body; and
   b) means for biasing the temperature sensor in the direction of the body in response to heat exchange with the body, wherein the means for biasing includes a bimetallic member adapted and configured to extend from a first position in the absence of the thermal energy source to a second position when in the presence of the thermal energy source, and wherein the bimetallic member includes multiple bimetallic strips attached to each other end to end in an accordion configuration.

2. The temperature measurement system claim 1, wherein the body is a thermal energy source and wherein the means for biasing the temperature sensor biases the temperature sensor in the direction of the thermal energy source in response to receiving thermal energy from the source.

3. The temperature measurement system claim 1, wherein the bimetallic member is generally elongate and deflects laterally when heated to move from the first position to the second position.

4. The temperature measurement system claim 1, wherein the temperature sensor includes at least one thermocouple.

5. The temperature measurement system of claim 1, wherein the bimetallic member functions as both a means for biasing and as a thermocouple.

6. The temperature measurement system of claim 1, wherein the thermocouple is of a type selected from the list consisting of tip sensitive, grounded junction, consumable, non-consumable, and thermopile.

7. The temperature measurement system of claim 1, wherein the temperature sensor includes at least one temperature sensor selected from the list consisting of a thermistor, an optic fiber thermometer, an RTD, a TSC, and a set of electrodes calibrated to infer temperature based on electrical resistance between the electrodes.

8. The temperature measurement system of claim 1, wherein the bimetallic member includes a first portion that is 302 stainless steel and a second portion that is 410 stainless steel.

9. The temperature measurement system of claim 1, wherein the temperature sensor is in thermal contact with the thermal energy source while in the second position through a protective layer.

10. The temperature measurement system of claim 9, wherein the protective layer is a wear bar affixed to the bimetallic member.

11. A temperature measurement system for monitoring temperature of a strand of metal in a continuous casting system comprising:

a) a temperature sensor adapted and configured to receive thermal energy from the strand of metal; and
b) a generally elongate bimetallic strip operatively associated with the temperature sensor, the bimetallic strip being configured and adapted to move the temperature sensor in response to thermal energy received from the strand of metal back and forth between:
   i) a first position in the absence of the strand of metal, in which the bimetallic strip retracts the temperature sensor to a position that clears a passing dummy bar without damage to the sensor; and
   ii) a second position when in the presence of the strand of metal, in which the temperature sensor is in thermal contact with the strand of metal.

12. A temperature measurement device comprising:
   a) a temperature sensor configured to measure a temperature of a body; and
   b) a heat sensitive biasing member coupled to the temperature sensor, wherein the heat sensitive biasing member is configured to bias the temperature sensor toward the body in response to heat exchange with the body, wherein the heat sensitive biasing member is configured to bias the temperature sensor away from the body in response to absence of heat exchange with the body, wherein the heat sensitive biasing member is configured to extend from a first position wherein the temperature sensor is displaced away from the body to a second position in which the temperature sensor is in close proximity to the body in response to heat received from the body, wherein the heat sensitive biasing member includes at least one bimetallic element, and wherein the at least one bimetallic element includes a plurality of bimetallic strips attached to each other end to end in an accordion configuration.

13. The temperature measurement device of claim 12, wherein the at least one bimetallic element is a bimetallic strip.

14. The temperature measurement device of claim 12, wherein the heat sensitive biasing member is configured to bias the temperature sensor toward the body in response to heat exchange with the body.

15. The temperature measurement device of claim 14, wherein the heat sensitive biasing member is configured to bias the temperature sensor away from the body in response to absence of heat exchange with the body.

16. The temperature measurement device of claim 15, wherein the heat sensitive biasing member is configured to extend from a first position wherein the temperature sensor is displaced away from the body to a second position in which the temperature sensor is in close proximity to the body in response to heat received from the body.

17. A method for measuring a temperature of a body, the method comprising steps of:
   a) providing a temperature sensor with a heat sensitive biasing member coupled thereto;
   b) extending the heat sensitive biasing member from a first position wherein the temperature sensor is displaced away from the body to a second position in which the temperature sensor is in close proximity to the body in response to heat received from the body;
   c) measuring the temperature of the body with the temperature sensor;
   d) removing the body from close proximity with the temperature sensor and heat sensitive biasing member; and
   e) retracting the heat sensitive biasing member from the second position back to the first position in response to lack of proximity with the body, wherein the body is a strand of metal in a continuous casting system, and wherein the step of retracting includes retracting the temperature sensor to a location that is clear from a dummy bar movably disposed within the continuous casting system, the dummy bar being adapted and configured to meet the strand of metal in the extended position when a new strand of metal is initially formed in the system, the dummy bar being further adapted and configured to retract as the strand moves through the system.

18. The method claim 17, wherein the step of extending includes extending to a second position in which the temperature sensor physically contacts a surface of the body.

19. The method of claim 17, wherein the step of measuring includes protecting the temperature sensor from direct physical contact with the strand of metal by measuring the temperature of the body with the temperature sensor disposed within a wear bar, the wear bar being in direct physical contact with the strand of metal.

20. A temperature measurement system, comprising:
a) a temperature sensor adapted and configured to measure a temperature of a body; and
b) means for biasing the temperature sensor in the direction of the body in response to heat exchange with the body, wherein the means for biasing includes a bimetallic member adapted and configured to extend from a first position in the absence of the thermal energy source to a second position when in the presence of the thermal energy source, wherein the temperature sensor is in thermal contact with the thermal energy source while in the second position through a protective layer, and wherein the protective layer is a wear bar affixed to the bimetallic member.

* * * * *